Figure 1:
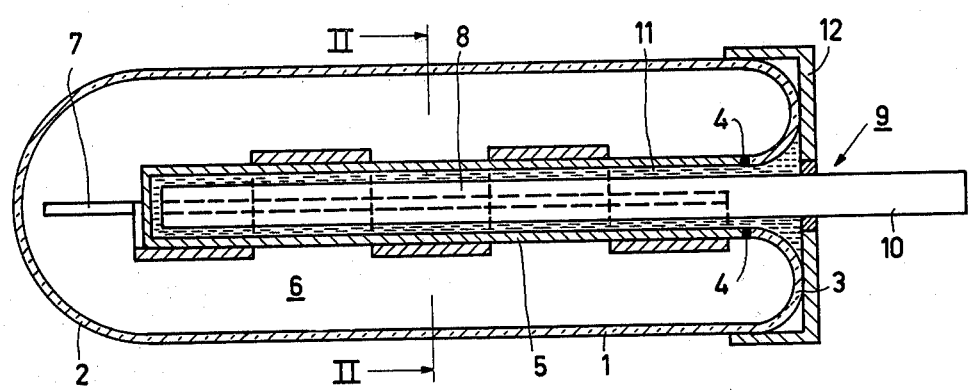

United States Patent [19]

van der Aa

[11] 4,416,261

[45] Nov. 22, 1983

[54] SOLAR COLLECTOR COMPRISING AN ABSORBER PLATE WHICH EXCHANGES HEAT WITH THE EVAPORATOR SECTION OF A HEAT PIPE

[75] Inventor: Herman H. M. van der Aa, Eindhoven, Netherlands

[73] Assignee: U.S. Philips Corporation, New York, N.Y.

[21] Appl. No.: 320,248

[22] Filed: Nov. 12, 1981

[30] Foreign Application Priority Data

Dec. 11, 1980 [NL] Netherlands .......................... 8006716

[51] Int. Cl.³ ................................................ F24J 3/02
[52] U.S. Cl. ..................................... 126/433; 126/443
[58] Field of Search ............... 126/433, 434, 443, 432, 126/417, 435; 165/104.14, 104.12

[56] References Cited

U.S. PATENT DOCUMENTS

| | | |
|---|---|---|
| 4,059,093 | 11/1977 | Knowles et al. .................... 126/438 |
| 4,127,105 | 11/1978 | Watt .................................... 126/433 |
| 4,291,676 | 9/1981 | Asselman ........................... 126/433 |
| 4,335,709 | 6/1982 | Slaats .................................. 126/433 |

FOREIGN PATENT DOCUMENTS

| | | | |
|---|---|---|---|
| 12692 | 12/1981 | European Pat. Off. ............ | 126/443 |
| 2307232 | 11/1976 | France ................................ | 126/433 |
| 2385051 | 10/1978 | France ................................ | 126/433 |

*Primary Examiner*—James C. Yeung
*Attorney, Agent, or Firm*—Rolf E. Schneider

[57] ABSTRACT

There is provided a solar collector comprising a metal heat pipe having an evaporator section and a condenser section. A metal tube is spaced from and surrounds the evaporator section, one end of such metal tube being closed and the other end being open. A metal solar heat absorber plate is thermally conductively connected to the metal tube. An evacuated transparent glass envelope is spaced from and surrounds the metal tube and the absorber plate connected thereto, such envelope being joined to the open end of the metal tube by means of a glass-metal seal. A thermally conductive medium fills the space between the metal tube and the evaporator section of the heat pipe.

2 Claims, 2 Drawing Figures

SOLAR COLLECTOR COMPRISING AN ABSORBER PLATE WHICH EXCHANGES HEAT WITH THE EVAPORATOR SECTION OF A HEAT PIPE

This invention relates to a solar collector comprising a metal absorber plate which absorbs solar heat and which exchanges heat with the evaporator section of a metal heat pipe, the absorber plate and the evaporator section being enclosed by an evacuated, transparent glass envelope, and the condenser section of the metal heat pipe projecting from the glass envelope through a wall thereof to exchange heat with a heat absorbing medium to be heated.

A solar collector of the kind set forth is known from U.S. Pat. No. 4,059,093.

The passage of the metal heat pipe through a wall of the glass envelope is problematic in this known type of solar collector. The glass-to-metal joint thus required is very vulnerable. This joint gives rise to problems during production and assembly and affects the universal use of this type of collector.

The present invention has for its object to provide a solar collector which does not involve a joint between the metal heat pipe and the glass envelope. The solar collector in accordance with the invention is characterized in that the evaporator section of the metal heat pipe is surrounded by a metal tube, one end of which is closed whilst its other end is connected to the wall of the glass envelope through which the metal heat pipe passes, the absorber metal plate being connected to the metal tube and a thermally conductive medium being present between the metal tube and the evaporator section of the metal heat pipe. Thus, a solar collector is obtained which is composed of two separate elements, that is to say the metal heat pipe on the one hand and the evacuated glass envelope containing the metal absorber plate on the other hand.

Even though the tube enclosing the evaporator section of the metal heat pipe may also be made of glass, this tube is preferably made of metal for reasons of thermal conductivity. In order to ensure that the gap between the metal tube and the evaporator section remains suitably filled with the thermally conductive medium, such medium in accordance with the invention preferably consists of a liquid, preferably a silicone oil. In view of the comparatively low heat flow density, no severe requirements are imposed on this thermally conductive medium and silicone oil is very suitable in this respect.

Figure 2:
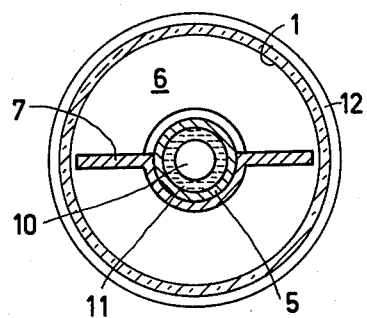

The invention will now be described in detail with reference to the accompanying drawing, in which:

FIGS. 1 and 2 are diagrammatic sectional views, taken at right angles to each other, of a solar collector, FIG. 2 being taken on line II—II in FIG. 1.

Reference numeral 1 denotes a tubular glass envelope which at one end is closed by a wall 2 and which at the other end has an inwardly turned annular wall 3 which is connected by a glass-metal seal 4 to one end of a metal tube 5 within the glass envelope 1, the other end of the metal tube being closed. The space 6 between the glass envelope 1 and the metal tube 5 is evacuated in order to counteract heat losses by conduction. On the metal tube 5 there is provided a metal absorber plate 7 which has a black layer which suitably absorbs the incident solar heat.

The evaporator section 8 of a metal heat pipe 9 is accommodated in the metal tube 5. The condenser section 10 of the metal heat pipe 9 projects from the glass envelope 1 and can be arranged to exchange heat with a heat-absorbing medium to be heated.

The gap between the evaporator section 8 and the tube 5 is filled with a thermally conductive medium 11 which suitably conducts heat, in this case silicone oil. In order to prevent leakage of the silicone oil, a cover 12 is arranged on the end of the glass envelope 1 and around the metal heat pipe. A solar collector is thus obtained which transfers the solar heat incident metal absorber plate 7 to the evaporator section 8 of the metal heat pipe 9 via the metal tube 5 and the silicone oil 11. The evaporable heat transport medium in the heat pipe will evaporate in the evaporator section 8 and the resulting vapour will condense in the condenser section 10, thus giving off its heat to the heat-absorbing medium to be heated.

The flow of heat from the metal absorber plate 7 to the evaporator section 8 is not significantly influenced by the silicone oil. In a practical embodiment, comprising a metal heat pipe having an external diameter of 6 mm and a metal tube 5 having an internal diameter of 6.6 mm, a temperature difference of only 4° C. occurred across the gap at a heat flow of 50 watts, which had a negligibly small effect on the overall efficiency of the solar collector.

Further advantages of the solar collector in accordance with the invention are: the possibility of separate manufacture of the glass envelope with the metal absorber and the metal heat pipe; simplified and less vulnerable mounting of the glass envelope and the metal heat pipe with the possibility of axial and angular adjustment of the two parts with respect to each other. It is thus possible to use different types of heat pipe for one type of envelope and absorber, depending on the operating conditions. This makes it possible to manufacture the parts in greater variety.

During transport, the glass envelope and the metal heat pipe may remain separated, so that the risk of damage is reduced.

What is claimed is:

1. A solar collector, which comprises a metal heat pipe having an evaporator section and a condenser section; a metal tube spaced from and surrounding the evaporator section, one end of said metal tube being closed and the other end being open; a metal solar heat absorber plate thermally conductively connected to the metal tube; an evacuated transparent glass envelope spaced from and surrounding the metal tube and the absorber plate connected thereto, said envelope being joined to the open end of the metal tube by means of a glass-metal seal; a thermally conductive liquid medium filling the space between the metal tube and the evaporator section of the heat pipe; and a seal between the heat pipe and the envelope.

2. A solar collector according to claim 1, in which the thermally conductive medium is a silicone oil.

* * * * *